United States Patent
Eldershaw et al.

(10) Patent No.: US 8,965,563 B2
(45) Date of Patent: Feb. 24, 2015

(54) HIGH THROUGHPUT PARCEL HANDLING

(75) Inventors: Craig Eldershaw, Belmont, CA (US); Eric J. Shrader, Belmont, CA (US)

(73) Assignee: Palo Alto Research Incorporated, Palo Alto, CA (US)

( * ) Notice: Subject to any disclaimer, the term of this patent is extended or adjusted under 35 U.S.C. 154(b) by 98 days.

(21) Appl. No.: 13/079,296

(22) Filed: Apr. 4, 2011

(65) Prior Publication Data

US 2012/0253507 A1  Oct. 4, 2012

(51) Int. Cl.
*G06F 7/00* (2006.01)
*G07B 17/00* (2006.01)
*B65G 47/00* (2006.01)
*G06Q 10/08* (2012.01)
*B25J 9/16* (2006.01)

(52) U.S. Cl.
CPC .......... *G07B 17/00661* (2013.01); *B65G 47/00* (2013.01); *G06Q 10/08* (2013.01); *B25J 9/1669* (2013.01); *G05B 2219/39109* (2013.01); *G05B 2219/39117* (2013.01); *G05B 2219/40006* (2013.01); *G05B 2219/40053* (2013.01); *G05B 2219/40424* (2013.01); *G05B 2219/40518* (2013.01); *G05B 2219/40604* (2013.01)
USPC ........................................... 700/218; 700/245

(58) Field of Classification Search
USPC ........ 700/218; 198/370.04, 381, 395, 397.02, 198/399, 474.1, 482.1; 705/401, 402, 403, 705/404, 407, 408, 410; 209/583, 552
See application file for complete search history.

(56) References Cited

U.S. PATENT DOCUMENTS

| | | | |
|---|---|---|---|
| 5,041,907 A * | 8/1991 | Sager et al. | 348/91 |
| 5,568,593 A * | 10/1996 | Demarest et al. | 700/247 |
| 7,590,468 B2 * | 9/2009 | Watanabe et al. | 700/259 |
| 7,592,034 B2 * | 9/2009 | Jung | 427/58 |
| 7,611,180 B1 * | 11/2009 | Fisher et al. | 294/65 |
| 7,689,311 B2 | 3/2010 | Ruml et al. | |
| 7,848,848 B2 * | 12/2010 | Busacca et al. | 700/249 |
| 8,229,586 B2 * | 7/2012 | Wallace et al. | 700/112 |
| 8,244,402 B2 * | 8/2012 | Wells et al. | 700/250 |
| 8,473,094 B2 * | 6/2013 | Becker et al. | 700/213 |
| 2002/0105291 A1 * | 8/2002 | Moo et al. | 315/312 |
| 2007/0204226 A1 | 8/2007 | Hindi et al. | |
| 2007/0255455 A1 * | 11/2007 | Busacca et al. | 700/249 |
| 2009/0096148 A1 * | 4/2009 | Usui | 269/45 |
| 2010/0017021 A1 * | 1/2010 | Wietgrefe | 700/232 |
| 2010/0206119 A1 * | 8/2010 | Ehnes et al. | 74/490.01 |

FOREIGN PATENT DOCUMENTS

WO  WO 2006117814 A1 * 11/2006

OTHER PUBLICATIONS

Do, "Online Continual Automated Planning Framework Based on Timelines", U.S. Appl. No. 13/007,790, filed Jan. 17, 2011.

* cited by examiner

*Primary Examiner* — Gene Crawford
*Assistant Examiner* — Lester Rushin
(74) *Attorney, Agent, or Firm* — Fay Sharpe LLP

(57) ABSTRACT

A high throughput parcel unloading system includes a robotic arm arrangement, including a cluster of robotic arms having grouping mechanisms. A conveyor system is also provided onto which parcels are placed by the robotic arm system. An image recognition system determines the position and arrangement of parcels within a container, and a control system is configured to receive image information from the image recognition system and control operation of the robotic arm system and conveyor system.

20 Claims, 6 Drawing Sheets

HIGH THROUGHPUT PARCEL HANDLING

BACKGROUND

The present application is directed to the movement of parcels. More particularly it is directed to a high-speed parcel handling system and method for unloading a container, such as a truck or trailer, of irregularly shaped and sized parcels, having a wide range of weights such as from a few ounces to 70 lbs. or more.

Also, even if the parcels are originally stacked in some pre-described order in a truck or trailer, as the truck or trailer moves, and hits speed bumps, makes turns, etc. the parcels shift, creating an unorganized accumulation within the container. For instance, a large box may be next to a small box, which is sitting on top of a mailing envelope. In other words, there is no true organization to the parcels having the large dynamic size, weight and shape differences. This situation makes achieving the goal of unpacking the parcels in an efficient manner, and placing them onto a conveyor belt at a high throughput difficult.

Presently, the most common way of unloading a container full of unorganized parcels is to have a human standing in the truck, picking and placing the parcels on the conveyor belt. It is understood that a person working alone in a container having 3,000 parcels can unload approximately 1,000 parcels in an hour, while two people working in the same container are able to move approximately 1,500 parcels in an hour. It is noted that adding still more people in a small area such as a container of a truck or trailer, the overall process slows down somewhat as the people need to stay out of each other's way. So even with two people working to remove 3,000 parcels from a shipping trailer, it would require 2 hours, whereas a single person would require 3 hours.

Automated parcel handling equipment does exist. An example of one such piece of equipment is vacuum moving block 100 shown in FIG. 1. As can be seen this is a large device having an overhead section 102 and a side section 104. The front faces of sections 102 and 104 each include a plurality of large suction cups 106. The vacuum moving block 100 is used to move large heavy objects. In operation, suction cups 106 on the overhead section 102 engage the top of a box being moved, and suction cups 106 on side section 104, (approximately a fixed 90° from the top section), engages a side of the same box. This allows the box to be picked up and moved to a different location. An issue with automated suction gripping device is that it is structured for large parcels and is not flexible in its use such that it can handle the dynamic size and shape range of parcels found, for example in the back of a shipping container.

If one would know that the parcels in a container were all of approximately the same size and weight, then a gripper arrangement such as shown in FIG. 1 could be sized to address the requirements. However, due to the varying sizes, shapes and weights of parcels found in a truck or trailer container, if the automated system is sized to grab the biggest and heaviest parcels, it would not be effective in moving smaller lighter parcels. Similarly, if sized to move small parcels it would be ineffective in moving the larger heavier parcels. Also if built to handle the larger parcels it would be a physically large system not allowing it to fit into a narrow area such as the interior of truck or trailer containers which are commonly anywhere from 10 to 26 feet deep with openings of 8 to 10 feet tall and 10 to 15 feet wide. Such fixed configuration systems would also be slow and clumsy in such a physically tight environment.

Therefore there is a need for an automated system and method to provide a high throughput movement of parcels from a truck or trailer container to a conveyor system, where the parcels have large dynamic range in the size, shape and weight, and where the parcels are in an un-organized state.

INCORPORATION BY REFERENCE

The following patents/applications are mentioned, the disclosures of each being totally incorporated herein by reference: U.S. Patent Publication No. 2007-0204226-A1, published Aug. 30, 2007, entitled "System And Method For Manufacturing System Design And Shop Scheduling Using Network Flow Modeling", by Hindi, et al.; U.S. Pat. No. 7,689,311, issued Mar. 30, 2010, entitled "Model-Based Planning Using Query-Based Model Component Executable Instructions", by Ruml et al.; and U.S. patent application Ser. No. 13/007,790, filed Jan. 17, 2011, entitled "Online Continual Automated Planning Framework Based On Timelines", by Do.

BRIEF DESCRIPTION

A high throughput parcel unloading system includes a robotic arm arrangement, including a cluster of robotic arms having grouping mechanisms. A conveyor system is also provided onto which parcels are placed by the robotic arm system. An image recognition system determines the position and arrangement of parcels within a container, and a control system is configured to receive image information from the image recognition system and control operation of the robotic arm system and conveyor system.

DETAILED DESCRIPTION

Automatically unloading parcels from a container in a high-speed manner, wherein the parcels have a large dynamic range of sizes, weights and shapes and are highly un-organized, has not been adequately addressed. The present disclosure provides a system and method which uses a set of small, high speed gripping mechanisms that can handle unloading parcels of varying sizes, weights and shapes at a high throughput by processing many of the parcels in parallel. In order to handle small parcels a single gripping mechanism is used, medium parcels may require multiple grippers (e.g., 2 to 5 grippers) which coordinate their motions allowing the grippers to act as a single larger gripper. While this slows down the average throughput it still allows handling of multiple medium parcels in parallel and remains an improvement over a single gripper system. For the largest parcels in the range, all of the grippers (e.g., 8 grippers) can be called on to operate as one large gripper, again, coordinating their motions and allowing the maximum payload parcel to be manipulated.

In one embodiment the gripping mechanisms are vacuum grippers with conformable cups and individually controllable pilot valves as are commonly used in material handling applications. These vacuum grippers have been proven to be able to handle a wide range of parcel surfaces.

In this disclosure, parcels are understood to be packages, including different sized and configured boxes, such as rectangular, square, or round boxes among others. Also considered as parcels herein are tubes and envelopes, as well as other items designed to hold an object. The parcels maybe made of any appropriate material including but not limited to cardboard, plastic, wood, and metal.

Figure 1:
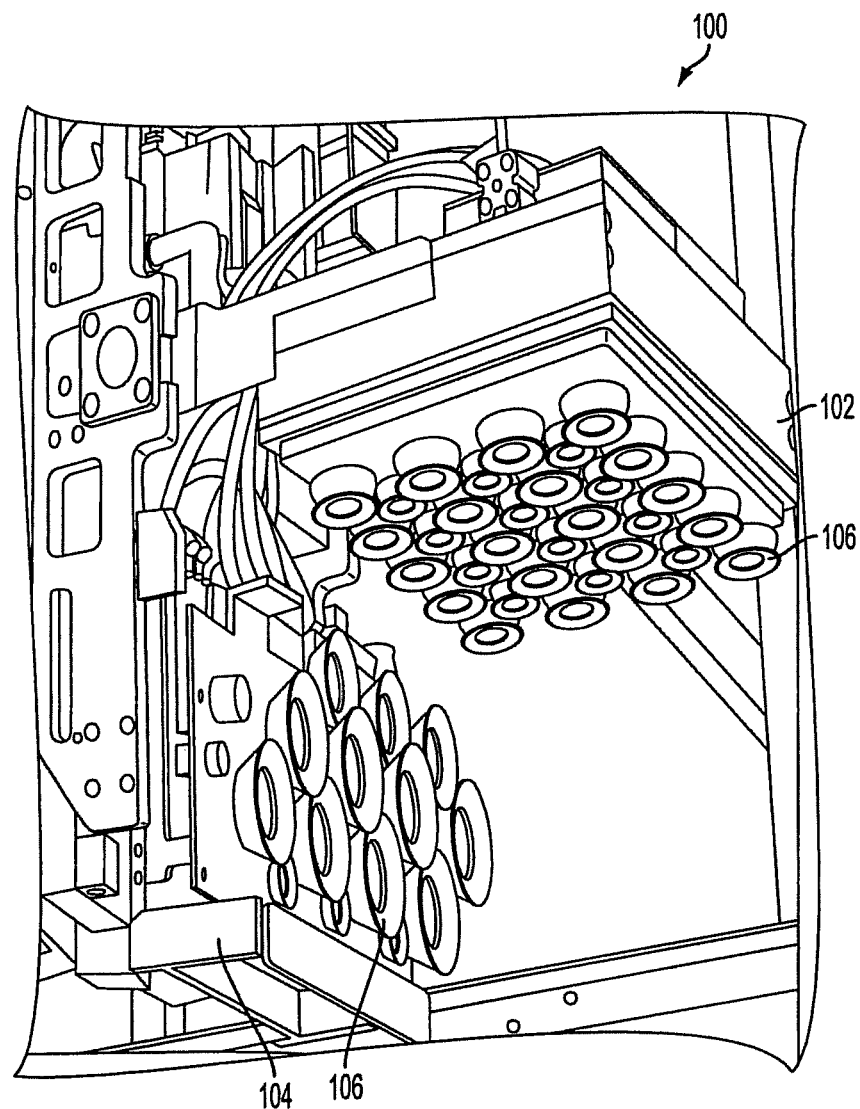
FIG. 1 depicts existing automated package handling.
Figure 2:
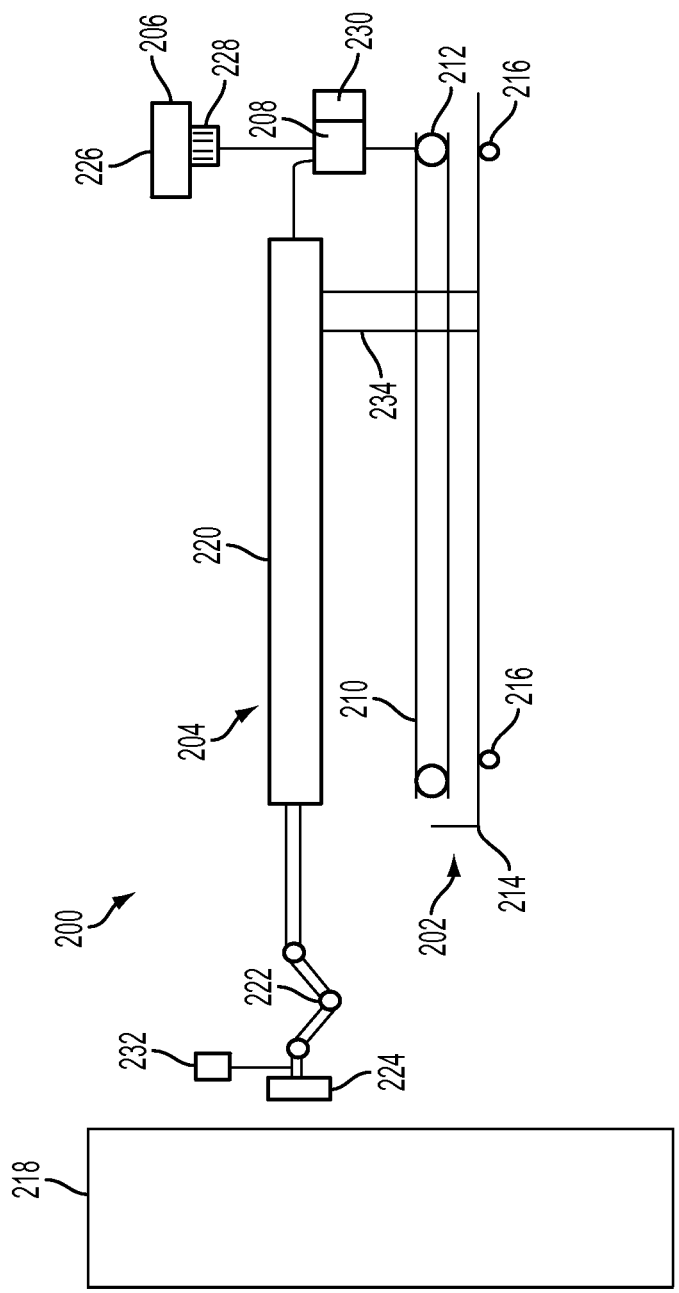
FIG. 2 depicts a side view of the high throughput parcel handling system for the present application.
Figure 3:
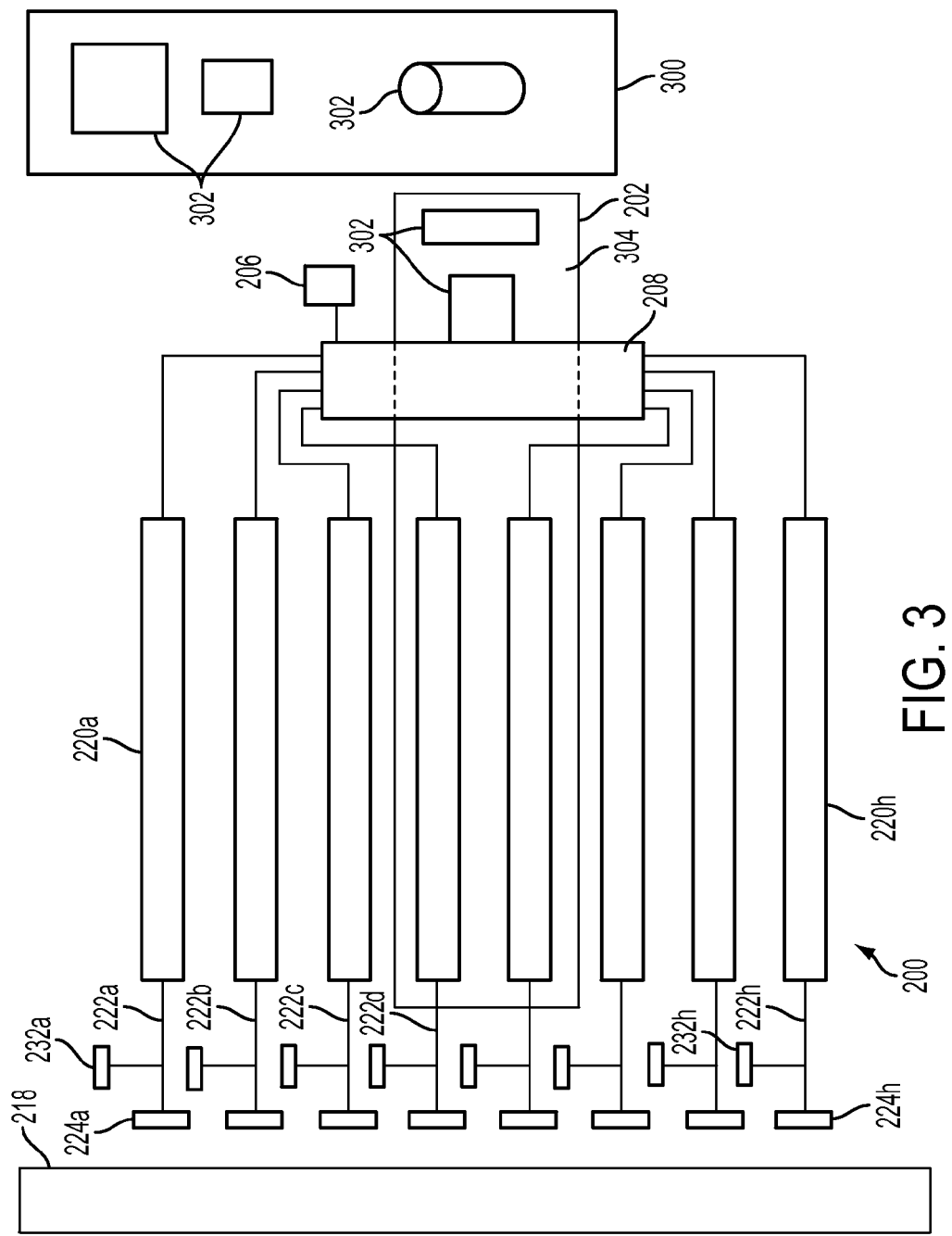
FIG. 3 depicts a top view of the parcel handling system of the present application.

Turning now to FIGS. 2 and 3, depicted are side and top views of one embodiment for a high throughput parcel handling system 200 according to the present application, which includes a conveyor system 202, a robotic arm system 204, a camera system 206, and a controller system (controller) 208.

In one embodiment conveyor system 202 is a cantilevered conveyor system having a belt 210 powered by a motor 212, carried in a frame 214. Frame 214 is sufficiently stiff so as to ensure the conveyor belt system 202 does not bend or wobble as parcels are placed on the belt 210. In addition, or in an alternative design, frame 214 may have rollers 216 to allow movement of the conveyor system 202 across a floor such as the interior floor of a container 218, which holds parcels.

Robotic arm system 204 includes a gantry arrangement 220 from which robotic arm arrangement 222 extends, the gantry arrangement provides length to allow robotic arm arrangement 222 to move into a position such that parcels may be reached by a gripper mechanism arrangement 224 attached to the arm portions. In one embodiment wiring for robotic arm arrangement 222 and gripper mechanism arrangement 224 are passed through an interior area of gantry 220.

A camera system 206 includes a camera 226 in operative connection with control system 208. The camera may be positioned to allow the camera to view the interior of container 218, where camera 226 is manually positioned. In other embodiments camera system 206 includes an actuator 228 which upon receipt of signals from control system 208 automatically moves camera 226 to a selected position, such as viewing the interior of the container. It is to be understood that while camera 226 is shown located near the controller the camera may be located at any location which will allow the camera to obtain an unobstructed view of the interior of the container.

Control system 208 also provides operational signals to conveyor system 202 and robotic arm system 204. For example, operational control signals from controller 208 are provided to motor 212 of conveyor system 202 to move the conveyor at an appropriate speed. Operational signals from control system 208 are further used to determine the movement and operation of robotic arm system 204.

An onboard power supply 230 is provided as part of system 200, while in other embodiments power is supplied from an electrical outlet. The power supply may be a battery, gas generator or other appropriate source of power.

System 200 may also, optionally, include a detail (fine feature) camera system 232 located up near or on gripping mechanism arrangement 224. This detail (fine feature) camera system 232 may be controlled by control system 208 to obtain detailed close-up views of individual parcels as the individual parcels are being addressed by the robotic arms.

Also, as shown in FIGS. 2 and 3 conveyor system 202, robotic arm system 204, camera system 206, control system 208, and power supply are configured as a single product, wherein conveyor system 202 and robotic arm system 204 are connected by connectors 234 so that these components move in synchronization. In alternative embodiments various ones of the above the components may not be connected, such as where conveyor system 202 and robotic arm system 204 may be designed as separate elements. In other designs, for example in a wireless design the control system 208 is separate from the other mentioned components and will send the operational control signals by a wireless connection.

Also, FIGS. 2 and 3 may appear to show the robotic arms as being the same size, it is however to be understood that this is not a requirement, and in certain embodiments at least some of the robotic arms are sized differently from other ones of the robotic arms. In these designs the larger robotic arms provide more lifting strength than the smaller arms. Therefore it is to be understood that FIGS. 2 and 3 encompass all such embodiments.

As shown more explicitly in the top view of FIG. 3 robotic arm system 204 includes gantry arrangement 220 having a plurality of gantry elements 220a-220h, robotic arm arrangement 222 including a plurality of individual robotic arms 222a-222h, and gripping arrangement 224 having a plurality of gripping mechanisms 224a-224h. The control system 208 is connected to each of components in a manner that allows the control system to control operation of the individual robotic arms 222a-222h independently. This independent control allows control system 208 to cause the robotic arms 222a-222h to operate individually or in a cooperative manner with each other.

It is to be understood that while FIG. 3 shows a plurality of individual gantries 220a-220h, in alternative embodiments a single gantry sized to carry all of the robotic arms may be used. Further, while FIG. 3 shows robotic arm system 222 as having eight robotic arms 222a-222h, in alternative embodiments, there may be more or fewer individual robotic arms.

In operation, control system 208 controls each of the robotic arms individually or, as mentioned, in a cooperative manner. For example, if the system determines that a parcel to be moved is too large and/or too heavy to be moved by a single gripper of robotic arms 222a-222h, then the system uses a plurality of the robotic arms to work cooperatively to lift the parcel. Expanding on this, robotic arms 222a, 222b and 222c may be used cooperatively to lift a single parcel, whereby robotic arm 222a engages a top portion of the parcel, and robotic arms 222b and 222c engage side portions of the parcel to provide sufficient lifting force to move the parcel. At the same time, robotic arm 222d is used to move another individual parcel which has been determined to be of a size and/or weight that a single robotic arm is sufficient to move the parcel. In this manner, multiple parcels are moved in parallel, providing a much improved speed and flexibility over systems which may have a single gripper system design.

The following further illustrates the benefit of the multiple gripper robotic arm design which allows for parallel movement, if there is a goal, for example, of moving 3,000 packages per hour, where the minimum weight of an individual package is 0.05 kg, and the maximum weight is 32 kg. Then the following calculations would appear appropriate if, for example, a number of grippers were eight, such as shown in FIGS. 2 and 3. In this situation it is estimated by the inventors that for the gripper to reach the vicinity of the package to be moved would take approximately 0.5 seconds, then further fine gripper positioning would take an additional 0.25 seconds. The engagement to the package would require another 0.25 seconds. The package would be lifted in 0.5 seconds and carried to the conveyor in 1 second. The gripper would then release the package to the conveyor—taking 0.25 seconds, requiring a total movement of 3.0 seconds per movement of the parcel from the container to placement on the conveyor belt. Having this determination, total arm motions required to move 3,000 parcels are shown below:

CHART 1

Total arm motions required to move 3000 parcels

Breakdown by package type

| Odd shapes: | 2% | 60 | parcels, are handled manually | |
|---|---|---|---|---|
| Soft bags and flats: | 8% | 240 | parcels need 1 gripper, taking | 240 arm motions |
| Light packages: | 45% | 1,350 | parcels needs 2 grippers, taking | 2,700 arm motions |
| Medium packages: | 35% | 1,050 | parcels needs 3 grippers, taking | 3,150 arm motions |
| Heavy packages: | 10% | 300 | parcel needs 6 grippers, taking | 1,800 arm motions |
| Total: | 98% | 2,940 | parcels | 7,890 arm motions |

From the above, it is then understood that for moving 3,000 parcels with an above assumed weight distribution would require 7,890 arm motions. As a single robotic arm can pick a parcel from the stack and place the parcel on a conveyor in approximately 3 seconds, and since eight arms are typically moving at once, then the estimated total time to move the 3,000 parcels would be:

3 seconds×7,890 motions/8 arms=2,959 seconds, which is less than 50 minutes (i.e., to move 3,000 packages). Achieving this rate of throughput is a significant improvement over manual unloading and existing automated unloading systems.

With continuing attention to FIG. 3, it is shown that conveyor belt system 202 matches up to a separate conveyor belt system 300 which allows parcels 302 to be passed to conveyor system 300 without intervention. However, as will be discussed, as system 200 removes more parcels from container 218, system 200 will be moved further into the container to reach parcels further back. This would mean moving a back-end 304 of conveyer system 202 away from second conveyor system 300. In some embodiments the resulting separation of the conveyor belt systems is avoided by configuring conveyor system 202 as an expandable conveyor system, whereby either the front end or rear end is extended as system 200 moves further into the container.

It is understood that a particular aspect of system 200 is the need to control the actions of the robotic arms in such a way that they are able to work individually or cooperatively without interfering with each other.

In one embodiment this is achieved by three control and planning levels, including: servo level (motion) control; motion planning and task planning.

Figure 4:
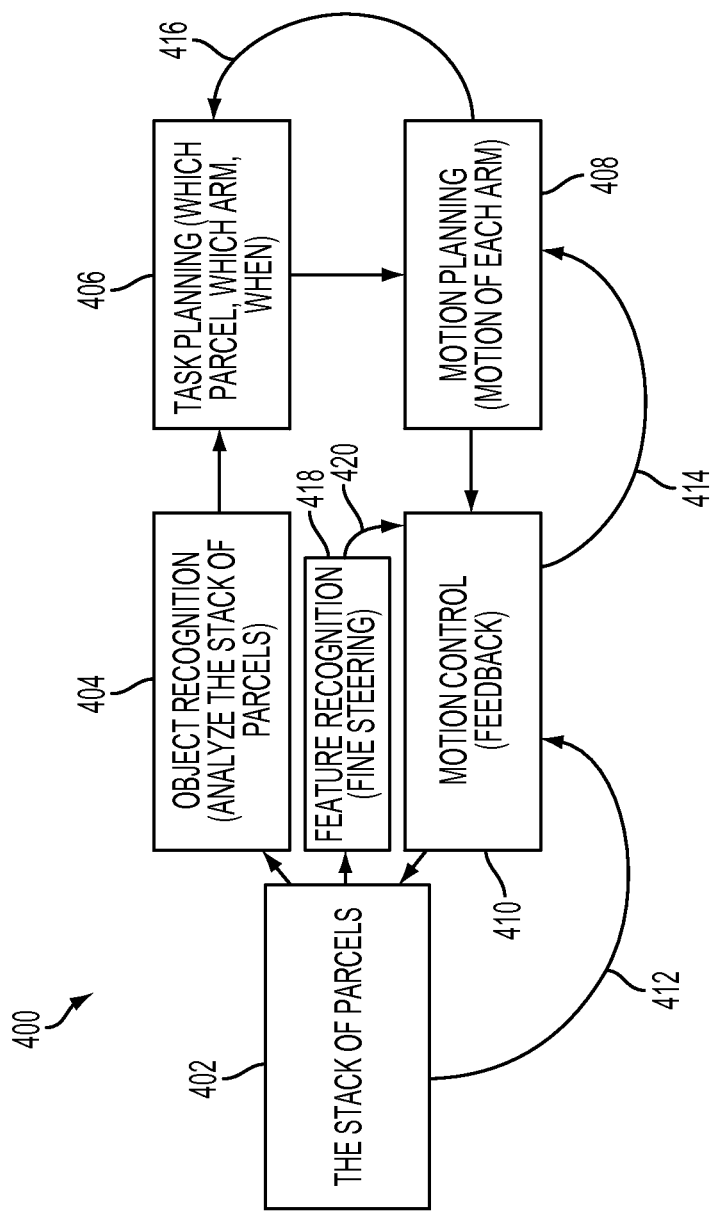
FIG. 4 is a block diagram illustrating the control and planning of the present application.

FIG. 4 provides a system control/planning block diagram 400 which illustrates control and planning for system 200. More particularly, the stack of parcels 402, are investigated by a camera system performing object recognition 404, which analyses the stack of parcels and obtains information related to their location, size, position, and configuration, among other attributes. Of course, the object recognition system block 404 will not be able to recognize each parcel in the container during an initial object recognition operation. Rather object recognition processing is an ongoing procedure, wherein as parcels are removed, additional object recognition processing is undertaken to analyze the stack as it then exists. The data obtained by the object recognition processing is passed to task planning block 406 to create an overall task plan for unloading the container (i.e., as much of the container that has been identified at that point in time). This task plan is provided to motion planning block 408 which generates motion plans for each robotic arm, where the motion plans are instructions on how each arm is perform its required operations to accomplish the tasks supplied to the arms by the task plans. The generated motion plan is then provided to a servo-level (motion) control system 410 that causes the robotic arms to move in a manner which grabs parcels from the stack of parcels 402. As is also shown in this high-level block diagram 400, as the motion controller operates, it can be provided with feedback 412. For example, if a plan was to have a robot arm raise a parcel to 30° above some zero position, but the arm is only at 20°, the information is fed back to the motion controller 410, which then either readjusts the movement directly, or provide this information as feedback 414 to motion planning block 408, which uses the feedback information to, on the fly, alter the motion plan provided to that particular robotic arm. The process then continues forward with the re-formulated motion plan.

Alternatively, if feedback 414 does not resolve the issue in the motion planning block 408, this block provides feedback 416 of the requirement (i.e., the robotic arm needs to be at 30° but is only at 20°) to task planner 406, wherein the task plan is revised. The revised, on the fly, task plan is then provided to the motion planning block 408 for further motion control and operation by block 410. An example of the task plan change would be that the system or task plan originally believed one robotic arm would be sufficient to move the particular parcel. However, feedback information would indicate that an additional robotic arm is necessary (e.g., the first robotic arm could only move the parcel to 20° instead of 30° as the parcel is too heavy, and therefore the task planner would readjust the task plan to provide that additional robotic arm to that particular parcel).

An optional additional aspect of the described control/planning is use of detail (fine feature) recognition 418, which provides fine steering of the robotic arms being controlled by the motion or servo-level control 410. In FIGS. 2 and 3 this concept is implemented as detail (fine feature) camera system 232. The information from the fine feature recognition camera system is provided 420 to the motion controller 410 to provide more precise control of the movement of the robotic arms.

Similar to the object recognition system, the detail (fine feature) recognition system uses information generated by a camera system which allows the fine feature recognition system 418 to obtain specific details of a parcel identified by the object recognition system (e.g., is the parcel square or round, what is the depth of the parcel, etc.). In other words, by placing cameras out on or near the ends of the robotic arms, it may be possible to obtain a more detailed recognition of each individual parcel. Of course in other embodiments the cameras may be located in different locations to obtain this detail information. In either case this more detailed information is fed back to the motion controller to be integrated into the motion control, thereby permitting more precise movement. For example, if the feature recognition system would see that a parcel is one foot wide, then this information being provided to the motion controller will allow the vacuum paddle of the robotic arm to move to the center of the parcel, providing a balanced contact, where it might otherwise have been more toward the front edge causing an imbalance in the lifting operation.

Figure 5:
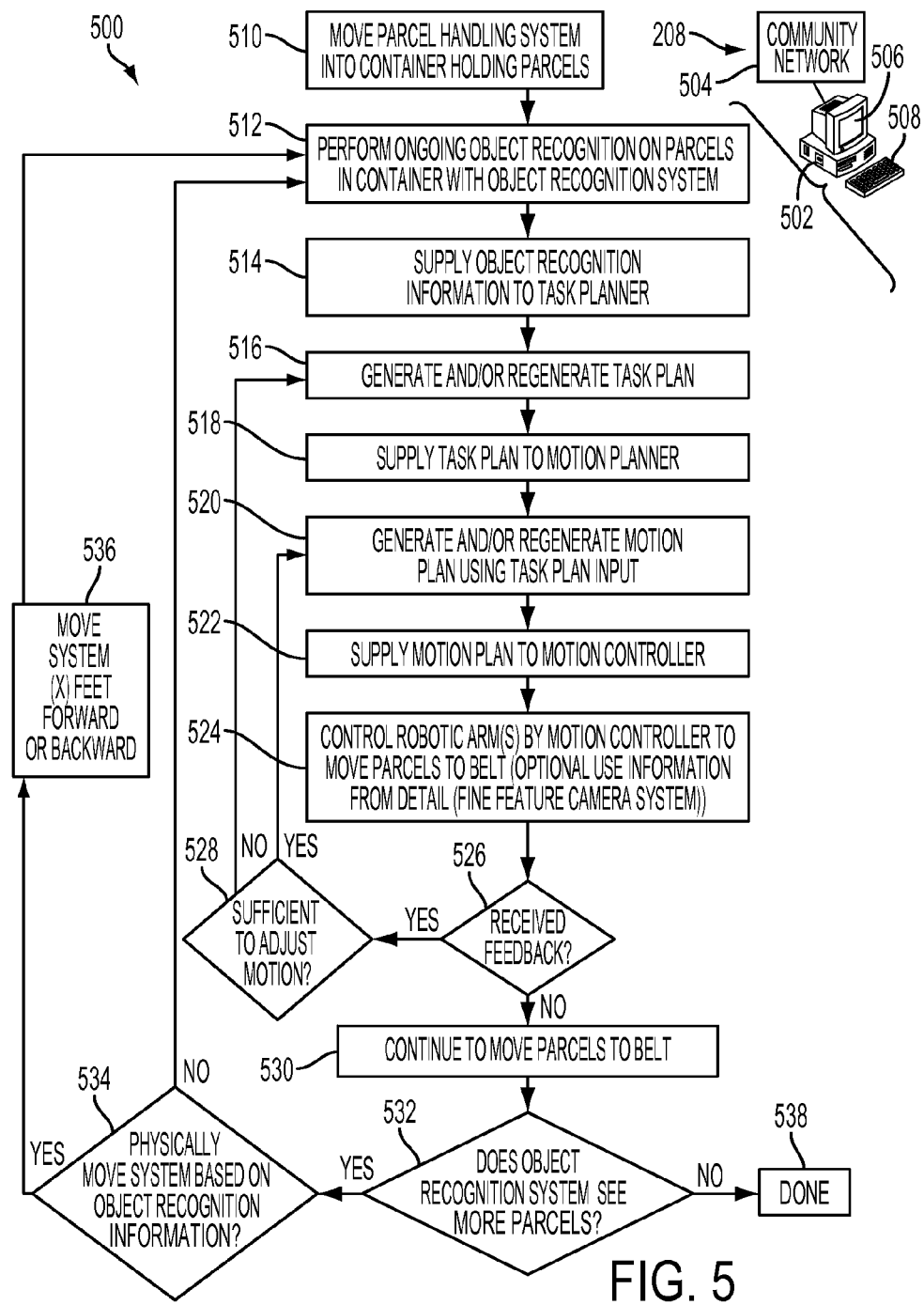
FIG. 5 is a flow diagram for controlling the operation of the high throughput parcel handling system.

Turning to FIG. 5, a flow diagram 500 which is implemented in an electronic computing device such as control system 208 of FIG. 2 is illustrated. In this Figure control system 208, is embodied as an electronic controller/computing device 502 capable of operating software, and configured such that it has a communication path arrangement 504 that supplies operational control signals to the conveyor belt system, robotic arm system, and camera systems such as shown in FIGS. 2 and 3. Also provided is an output 506 which may be an electronic display, printer or other device which shows the status of the system, as well as an input 508 which may be a keyboard, electronic mouse, roller ball or other device that allows a user to interact with system 200.

Prior to starting operation, the parcel handling system is moved towards and/or into a container 510. Then once in operation, the parcel handling system performs ongoing object recognition 512 via an appropriate camera system. The object recognition operations acquire information as to the position, size, and configuration of at least some of the parcels in the container. As previously mentioned, this object recognition process is ongoing, meaning as parcels are removed the object recognition process obtains new and additional data regarding the parcels within the container. This originally obtained, and/or updated object recognition information is supplied to the task planner 514. The task planner uses the information to generate task plans 516, on the fly, which means the task plans are created as the high throughput parcel handling system is working to unload parcels.

The motion planner is supplied with task plans 518 in order to generate or regenerate motion plans 520. These motion plans are then supplied to the motion controller 522 and used by the motion controller to control operation of the robotic arms 524. For example, the motion controller causes the robotic arms to pick and move parcels to the belt. During this operation, the high throughput parcel handling system may receive feedback (e.g., robotic arm is at 20° not 30°) 526. When feedback is received, a determination is made whether an adjustment may be made to the motion plan to compensate or address the received feedback 528. If this is possible (YES), the process moves back to the generation or regeneration of the motion plan 520 using the existing task plan, and the process repeats. If the feedback received in step 526 cannot be addressed by adjustment of the motion plan (NO) at 528, then the process moves back to generate and/or regenerate the task plan 516. The regenerated task plan is then used in the process. At step 526, when no feedback is received (NO), the process continues to move parcels to the belt 530 using the existing plans. At the same time the object recognition process is continually acquiring information regarding the recognition of more parcels 532, including a distance the parcels are within the container. If more parcels are observed or detected by the object recognition system within the container (YES), then a determination is made as to whether the high throughput parcel handling system should physically move or be moved further into the container for further processing 534. If such movement is not necessary (NO) (i.e., the robotic arms are still able to reach parcels in the container) the process continues the ongoing object recognition where a new parcel pile model is developed and the process continues (i.e., using the new model of the parcel pile) 512.

If, however, at step 534 it is determined the system should be moved (YES), the high throughput parcel handling system is moved a distance forward (or in some instances possibly backward for missed parcels) 536, and then the process does the continuous ongoing object recognition 512 and continues. When at step 532 the object recognition system sees no more parcels to remove, the parcel moving operations is completed 538.

In an alternative embodiment, a user may manually make the decision to move the system further into the interior of the container. In this situation steps 534 and 536 may not be needed, and the object recognition system will simply create a new parcel pile model based on the information gathered at the new location.

In still a further alternative, the information acquired by the detail (fine feature) camera system is supplied to the motion controller (step 524) to refine the movement of the parcels.

As mentioned, the high throughput parcel handling system of the present application employs a three level control/planning design including: servo-level (motion) control, motion planning and task planning. In one embodiment the low-level servo-level (motion control) is provided through COTS controllers.

Motion planning is used to determine the precise motion of every joint and telescoping section in the robot arms, as there are a large number of possible motions. For example, in a system having seven arms including one main arm (e.g., an arm larger than the other six arms), and where the main arm has three actuators and each of the six smaller arms have five actuators each, then there are a total of over 30 degrees of freedom, each of which must be taken into consideration for smooth and simultaneous control of the robotic arms.

At all times, the robotic arms are controlled to avoid self-intersection (i.e., colliding with one another). Planning the motion of plunging the arms' end-effectors (e.g., the gripping mechanisms) into the narrow gaps between parcels while the parcels are static is one level. However once the parcel is gripped, then the motion plan accounts for not just the volume of space swept out by the robotic arms, but that of the moving parcel as well (i.e. the parcel being moved should not bump other static parcels). Of course the multiple arms may be carrying two or three smaller parcels at once in tight coordination.

To accomplish the above a real-time computation is used as each time the truck is opened, a different situation is presented—indeed the details of the situation (e.g., the composition of the parcel pile) are gradually unfolded as layer after layer of parcels is removed. In this application, the parcels form a three-dimensional interlocking "jigsaw". In some cases, the exact shape of a parcel being moved may not be fully known even at the time that it is picked. For example the depth of a package (how far it extends back into the truck) may not be easy to see or measure until the package has been pulled most of the way out. Even with the best initial planning, picking up one parcel may unavoidably cause some movement in the neighboring parcel, adding a very dynamic aspect to the planning problem, and whereby the on-the-fly plan development is employed.

The mentioned task planning is the highest layer of planning control. The task planner receives the object recognition information and in one embodiment creates a model of the parcel pile in the container. Again, as the information from the object recognition process will change as parcels are removed from the container, the model of the parcel pile will be updated. Using the parcel pile model, the task planner generates a near-optimal or best possible choice for the next parcels to be removed. For example, a parcel at the top of the front layer of the pile of parcels is a likely candidate to be chosen. However, even within this initial decision, there are still choices to be made by the task planner based on the information obtained via the object recognition process. The near-optimal or best possible choice would then also depend on criteria including the relative access to the parcel's top and sides, and how likely it is to be supporting other adjacent parcels. An example of another criteria to be considered in forming the task plan is if several small parcels are to be moved at once with multiple independently working arms, then adjacent parcels are generally avoided as this is simpler (i.e., faster) for the task plan, since the arms do not cross each other's paths, reducing the chance the one arm's parcel motion will bump another arm's parcel. However, near adjacent parcels are rated as higher to be selected rather than widely separated parcels, due to time to reach and ability of arms to reach widely separated parcels.

The task planner therefore uses the model of the parcel pile created by information from the object recognition system to determine the order in which parcels are to be selected, and the arms which are to be associated with those parcels to accomplish the removal.

The task planner is also determines where the parcels are to be placed on the belt. This is done to insure a regular spacing of parcels on the output conveyor belt.

The task planning layer also handles exceptions. In many task planning applications, exceptions occur rarely and usually correspond to a catastrophic failure—usually where the system detects something that differs from its world model and requires human intervention. This application is different because "exceptions" are commonplace occurrences and must be largely handled automatically. The most frequent exception arises if the grippers fail to grip the parcel effectively, so that the parcel either: remains in place when the arms lift; is picked up but not in the intended orientation; or else it is disturbed but becomes prematurely detached from the arm. The most drastic but still common exception occurs where the motion of one parcel disturbs another one about to be picked up. In either of these cases, when the exception arises, the task planner revisits the task plans and regenerates task plans (or creates a new task plans) which is sent to the motion planner.

Figure 6:
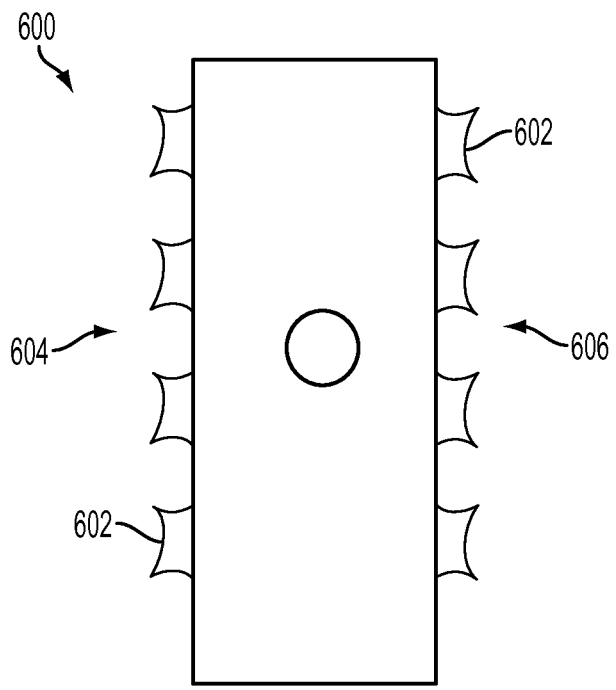
FIG. 6 depicts a gripping mechanism.

Turning to FIG. 6, illustrated is a side view of one embodiment of a gripping mechanism in the form of a vacuum paddle 600 which may be used as a gripping mechanism. In this design, vacuum paddle 600 includes vacuum cups 602 on both surfaces of the paddle 604 and 606. This design allows for yet further options in manipulating which side may be used to attach to the package.

Figure 7:
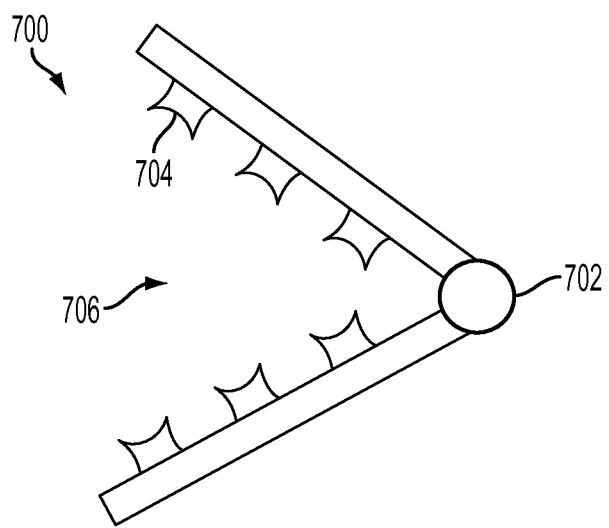
FIG. 7 depicts a further gripping mechanism.

Turning to FIG. 7, illustrated is a further embodiment of a paddle 700 which includes a hinge area 702 that allows the paddle to be rotated out of a planar position. In some embodiments, the paddle may have vacuum pads 704 located on at least a first surface 706. The vacuum pads may also be on both surfaces, similar to FIG. 6, wherein the hinge allows movement in either direction.

Still further in alternative embodiments similar to the description of the conveyor system being a telescoping or extending conveyor system in some embodiments where the size or length may be altered, the gantry may also be of a telescoping or extending configuration.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A parcel unloading system to unload parcels from an unorganized parcel pile within a container, the system comprising:
    a robotic arm system including a plurality of robotic arms having gripping mechanisms;
    a conveyor system configured to receive the parcels unloaded from the unorganized parcel pile within the container, wherein the image recognition system is continually acquiring image information regarding the recognition of parcels in the unorganized parcel pile;
    an image recognition system configured to generate images of the unorganized parcel pile within the container; and
    a control system configured to receive image information from the image recognition system and to control operation of the robotic arm system and the conveyor system, wherein the control system receives the image information from the image recognition system as feedback to perform real time computations to generate on-the-fly motion plans for the operation of the robotic arm system, wherein the robotic arm system is configured to extend further into the container as the parcels are removed from the unorganized parcel pile, and each robotic arm of the plurality of robotic arms is operationally independent of the other robotic arms of the plurality and configured to be used independently and cooperatively with the other robotic arms, and wherein independently means each of the plurality of robotic arms are configured to be controlled so the associated gripper of each of the robotic arms act to independently grasp single distinct parcels from the parcel pile and to remove each of the single distinct parcels to a conveyor system in a parallel manner, and cooperatively means two or more of the plurality of robotic arms are configured to be controlled to co-ordinate the corresponding grippers to grasp a same parcel of the parcel pile.

2. The system of claim 1 wherein at least one of the plurality of robotic arms is of a size different from at least one of the other of the plurality of robotic arms.

3. The system of claim 1 wherein the controller is configured to provide real time layered planning for the robotic arm system, and the real time layered planning includes motion (servo level) control, a motion planner, and a task planner, and wherein the motion (servo level) control is configured to control movement of the robotic arms, the motion planner is configured to generate the motion plans to control the movement from the unorganized parcel pile of the robotic arms of the robotic arm system by the motion control, and the task planner is configured to generate task plans to determine an order of parcel movement using the image information received from the image recognition system, wherein the generated task plans include task plans created as the parcel handling system is working to unload parcels and wherein the altered task plans include a change of the task plan from use of a single robotic arm to grasp a particular parcel to the use of more than a single robotic arm to grasp the same particular parcel.

4. The system of claim 1 wherein the gripping mechanisms of the robotic arms are vacuum grippers.

5. The system of claim 1 wherein the image recognition system performs repeated object recognition operations to update the information of the parcels in the container, wherein the image recognition system is a camera based image recognition system.

6. The system of claim 1 further including a detail (fine feature) camera system, wherein cameras of the detail (fine feature) camera system are positioned at an end portion of the robotic arms.

7. The system of claim 6 wherein the detail camera system is configured to provide information to motion (servo-level) control for fine control of the movement of the robotic arms.

8. A method of unloading parcels from a container holding a plurality of parcels in an unorganized parcel pile, the method:
   acquiring information related to the parcels in the unorganized parcel pile in a container by an image recognition system, wherein the image recognition system is continually acquiring image information regarding the recognition of parcels in the unorganized parcel pile;
   generating a parcel pile model of at least some of the of the parcels in the unorganized parcel pile in the container;
   using the parcel pile model to generate a task plan, by a task planner, the task plan assigning robotic arms of a robotic arm system to specific parcels in the container;
   supplying the task plan to a motion planner to generate a motion plan, wherein the motion plan defines the movement of the robotic arms to accomplish the objectives of the task plan;
   supplying the motion plan to a motion (servo-level) control system to operate and control the robotic arms;
   using feedback information in at least one of the task planner or the motion planner to adjust at least one of the task plan or the motion plan while parcels are being unloaded, wherein the image information from the image recognition system is a form of the feedback information, wherein the adjustment of at least one of the task planner or the motion planner includes changing an order in which parcels of the unorganized parcel pile are to be removed from the unorganized parcel pile, and wherein the image information feedback is used to perform real time computations to generate on-the-fly motion plans for the operation of the robotic arm system; and
   unloading the parcels by the robotic arms, wherein each robotic arm of the plurality of robotic arms is operationally independent of the other robotic arms of the plurality and configured to be used independently and cooperatively with the other robotic arms, wherein independently means each of the plurality of robotic arms are configured to be controlled so the associated gripper of each of the robotic arms act to independently grasp single distinct parcels from the parcel pile and to remove each of the single distinct parcels to a conveyor system in a parallel manner, and cooperatively means two or more of the plurality of robotic arms are configured to be controlled to co-ordinate the corresponding grippers to grasp a same parcel of the parcel pile.

9. The method of claim 8 wherein the parcel pile model is updated by the image recognition system as parcels are unloaded, wherein the image recognition system is a camera based image recognition system.

10. The method according to claim 8 wherein the unloading includes placing the parcels onto a conveyor belt system.

11. The method according to claim 8 wherein the operating at least two of the plurality of robotic arms in a cooperative manner to move the same parcel, and wherein the operating of the at least two of the plurality of robotic arms is controlled by the same motion plan.

12. The method according to claim 8 wherein the unloading of the parcels by the robotic arms include moving the parcels by use of vacuum grippers.

13. The method according to claim 8 further including applying detail (fine feature) image recognition information to the motion control to provide detailed information regarding a particular parcel.

14. The method of claim 8 wherein the robotic arms are configured to operate in multiple degrees of freedom.

15. The method of claim 8 wherein at least one of the plurality of robotic arms is of a size different from at least one of the other of the plurality of robotic arms.

16. The system of claim 1 wherein the robotic arms are configured to grasp and move individual parcels having a minimum weight of 0.05 kg, and a maximum weight of 32 kg.

17. The system of claim 1 wherein the conveyor system is configured to move and the movement of the conveyor system includes movement into an interior of the container which holds the parcels as the parcels are removed from the unorganized parcel pile, wherein the movement of the conveyor system is coordinated with a movement of the robotic arms into the container.

18. The method of claim 8 further including moving the conveyor system into an interior of the container which holds the parcels as the parcels are removed from the unorganized parcel pile, wherein the moving of the conveyor system is coordinated with a moving of the robotic arms into the container.

19. The system of claim 1 wherein the conveyor system and robotic arm system are connected permitting the conveyor system and robotic arm system to move in synchronization.

20. The system of claim 1, wherein the conveyor system is an expandable conveyor system, wherein at least one of a front end and a rear end is extendable.

* * * * *

UNITED STATES PATENT AND TRADEMARK OFFICE
CERTIFICATE OF CORRECTION

PATENT NO. : 8,965,563 B2  
APPLICATION NO. : 13/079296  
DATED : February 24, 2015  
INVENTOR(S) : Craig Eldershat et al.

Page 1 of 1

It is certified that error appears in the above-identified patent and that said Letters Patent is hereby corrected as shown below:

On the title page item (73) Assignee should read: Palo Alto Research Center Incorporated, Palo Alto, CA (US)

Signed and Sealed this  
Seventh Day of July, 2015

Michelle K. Lee  
*Director of the United States Patent and Trademark Office*